United States Patent [19]

Labes et al.

[11] Patent Number: 4,657,349

[45] Date of Patent: Apr. 14, 1987

[54] ELECTRO- AND MAGNETO-OPTIC DEVICES

[75] Inventors: Mortimer M. Labes, Philadelphia; Beverly D. Bostwick, Levittown, both of Pa.

[73] Assignee: Temple University, Philadelphia, Pa.

[21] Appl. No.: 640,718

[22] Filed: Aug. 14, 1984

[51] Int. Cl.⁴ .............................................. G02B 26/00
[52] U.S. Cl. ...................................................... 350/362
[58] Field of Search ......................................... 350/362

[56] References Cited

U.S. PATENT DOCUMENTS 3,341,274 9/1967 Marks ............................. 350/362 X
3,512,876 5/1970 Marks ................................. 350/362
3,527,525 9/1980 Marks ................................. 350/362
4,078,856 3/1978 Thompson et al. ................. 350/362
4,113,362 9/1978 Saxe et al. .......................... 350/362

Primary Examiner—Bruce Y. Arnold
Attorney, Agent, or Firm—Ratner & Prestia

[57] ABSTRACT

An electro- and magneto-optic device which comprises a fluid suspension of anisotropic platelets in a dielectric media, and a means for imposing an electrical or magnetic field on the suspension. Orientation of such platelets in the media is accomplished by imposition of an electrical or magnetic field. The invention may be used to provide an information display or a field controlled shutter in window glass.

13 Claims, 3 Drawing Figures

FIG. 2
FIG. 3
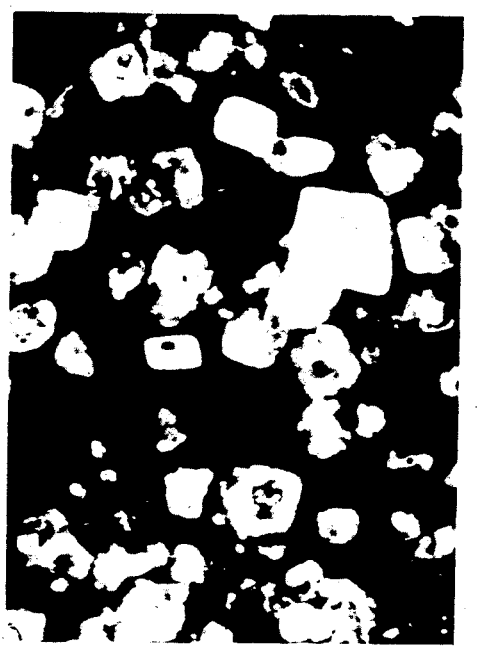

ELECTRO- AND MAGNETO-OPTIC DEVICES

This invention was made during work performed under U.S. Government Grants Nos. DAA29-81-K-0003 and a DAA29-84-K-0036 and is therefore subject to certain governmental rights therein.

BACKGROUND OF THE INVENTION

This invention pertains to an electro- or magneto-optic device wherein an electric or magnetic field is imposed to modify the optical properties of a fluid suspension in the device, to the method by which the optical properties are modified, and to applications therefor, such as electrically controlled shutters and electronic information displays.

Electrooptic effects using dipole suspensions of needle-like particles have been known since the late 1960s (A. M. Marks, Applied Optics, Volume 8, page 1397 (1969)). More recently, application of these effects by placement of the dipole suspension in a porous material has been suggested (G. Beni, H. G. Craighead, and S. Hackwood, Applied Physics Letters, Volume 39, page 195 (1981)).

With respect to dipole platelets, as contrasted with needles, a variety of crystalline, platelet materials have been known; however, the dipole characteristic of such platelets may not have been recognized. Typically such platelets are made up of thin transparent crystal layers of high refractive index which impart a particular light reflective characteristic to the platelets. This characteristic is observable as a pearlescent or iridescent effect. Such platelets are commonly used in decorative and cosmetic applications and are referred to as nacreous pigments. See for example "Nacreous Pigments", L. M. Greenstein and Encyclopedia of Polymer Science and Technology, Volume 10, published by John Wiley and Son (1969).

The chemical composition of common pigments of this type include various organic compounds, such as guanine; and inorganic materials, e.g. basic lead carbonate, bismuth oxychloride, lead hydrogen arsenate and lead hydrogen phosphate, and titanium dioxide coated mica. Pearlescent properties have also been reported for nafoxidine hydrochloride, an organic material which has been otherwise described in the technical literature with reference to its liquid crystalline properties in concentrated water solution and for its physiologic effect as an estrogen antagonist.

Notwithstanding this background knowledge, there have been relatively few practical applications of electrooptic effects in dipole needle suspensions and, to applicant's knowledge, a total absence of any suggestion to use nacreous pigment-type material in any sort of electro- or magneto-optic device. Moreover, currently available electrooptic devices and methods tend to be unsuitable for use in large area applications. Accordingly there appears to be a potentially significant need for more practical addressable, optical devices and methods.

It is the general object of the present invention, therefore, to provide an electro- or magneto-optic device (and method) which is potentially more practical for large applications than those heretofore available.

BRIEF DESCRIPTION OF THE INVENTION

The general object, and other more specific objects which will be apparent in the course of the subsequent description of the invention, are met by a device and method preferably comprising spaced parallel plates, at least one of which is transparent, the space between the plates being occupied by a fluid suspension of anisotropic platelets in a dielectric media, the device either including, or being adapted to be combined with, a means for selectively imposing an electrical or magnetic field on at least a part of the space between the plates. Such a device may be used, for example, as window glass with electrically addressable shutters.

In a more general sense, the spaced parallel plates are not required. For example, oriented platelets in a polymerized film may be obtained by subjecting the polymer precursor containing platelets, in film form, to the influence of an electrical or magnetic field to orient the platelets, and then polymerizing the film.

When the platelets are oriented perpendicular to transmitted light, the transmissivity of the suspension is significantly different then when the platelets are oriented parallel to the light transmission direction. This is the electrooptic effect produced in accordance with the present invention.

For a better understanding of the present invention, reference may be made to the appended figures and to the detailed description of the invention which follows, taken together with the subjoined claims.

BRIEF DESCRIPTION OF THE FIGURES

FIGS. 2 and 3 are photomicrographs of the face of a cell embodying the present invention, in the electrically addressed and non-addressed states, respectively.

DETAILED DESCRIPTION OF THE INVENTION AND PREFERRED EMBODIMENT

Figure 1:
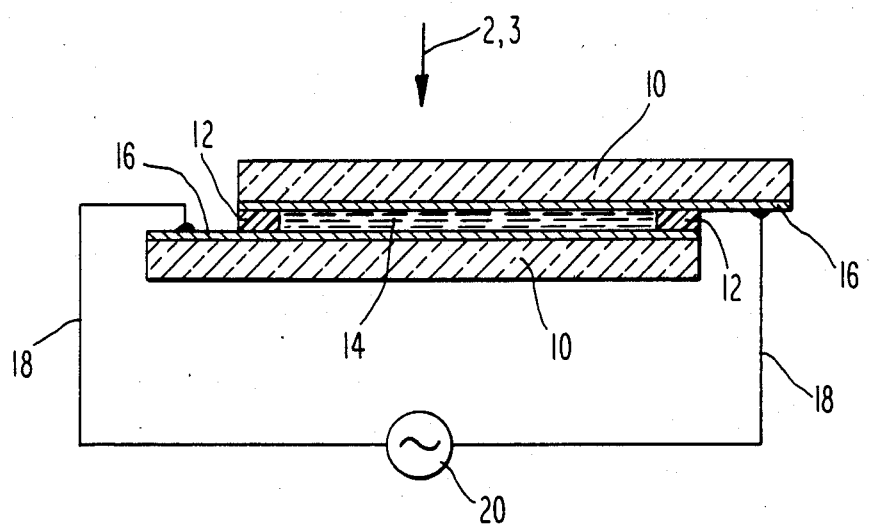
FIG. 1 is a diagramatic illustration of an electrooptic device embodying the present invention.

The platelets included in the fluid suspension of the present invention are "anisotropic," i.e. their electrical characteristics in three mutually perpendicular axial directions are not uniform. Typically, these crystals are thin and flat and sometimes laminar in nature. The anisotropic nature of the platelets causes them to have a dipole moment and a magnetic moment. Because of this characteristic, the platelets are responsive to an electrical or magnetic field, as in the operation of the device of the present invention, and thus align or orient themselves accordingly, so long as they are mobile. Such mobility is provided in the device of the present invention by suspending the platelets in a fluid (non-viscous) medium. In order to avoid interference with the electrical effects on the platelets in this device, the fluid suspension medium must, of course, be a good insulator.

Referring specifically to FIG. 1, there is shown an electrooptic cell comprising spaced parallel transparent plates (typically glass) 10, the spacing of which is maintained by electrically non-conducting (typically Mylar) spacers 12 and, disposed within the space between transparent plates 10, a fluid suspension of anisotropic platelets in a dielectric media 14. Electrodes 16, connected by leads 18 to an alternating current source 20, are included as a means of imposing an electrical field on that part of the fluid suspension within transparent plates 10 and specifically between electrodes 16. These electrodes are usually a semitransparent material such as tin or indium oxide, or a combination of these materials, coated on to the inner walls of the glass plates; alternatively the field may be imposed by electrodes exterior to the cell.

The effect of imposing such an electrical field is illustrated by the orientation of the anisotropic platelets, as seen by reference to FIGS. 2 and 3.

FIGS. 2 and 3 respectively, are photomicrographs showing the face of an electrooptic cell in its alternate states, viewed in the direction of arrow 2, 3 in FIG. 1.

As shown in FIG. 2, an electrical field has induced a transmissive state by causing anisotropic platelets within a fluid suspension within the cell to be aligned with the imposed electrical field. The platelets are seen primarily in edgewise view, which appear as needles, except for a small proportion, on the order of 5%, which remain unaligned.

In the alternative state of FIG. 3, the cell is shown without the effects of an electrical field imposed thereon and the platelets disposed therein are in the relaxed state, tending to be generally oriented parallel to the glass plates. A small proportion of the platelets remain unoriented and appear therefore as needle-like or semi-needle-like structures in edgewise view.

Substitution, of magnetic poles at the edges of the cell shown in FIG. 1, for electrodes 18, in order to impose a magnetic field parallel to transparent plates 10, and the imposition of a magnetic field thereby, results in a similar effect except that anisotropic platelets 14 are further oriented so that not only are they perpendicular to the plates 10, and thus parallel to the direction of transmission of light through the electrooptic device illustrated, but also perpendicular to the magnetic field.

A device, as shown in FIG. 1, in which the field is imposed selectively on only a part of the transparent plate surface may be used as an electronic display, addressable by application and removal of the electrical field selectively to a part of the device. Alternatively, a device such as that shown in FIG. 1 may be provided with electrodes or magnetic plates which affect substantially the entire cell, the electrodes themselves being sufficiently thin to be effectively transparent to incident light. Such a device may then be used as an electronically controllable window or shutter, reversible between a fully transparent state and a partially or non-transparent state.

In accordance with the method of the present invention, an electrical or magnetic field may be applied to orient platelets in polymerizable vehicles or vehicles which set by solvent evaporation. Upon setting of the vehicle a pearlescent effect may be produced in the resultant formed product.

While the invention has not been sufficiently tested to demonstrate what might be described as an overall preferred embodiment, the embodiment most thoroughly tested to date, and that which is preferred from the standpoint of the stability of the fluid suspension, comprises a device in which transparent plates 10 are glass plates coated with indium-tin oxide separated by Mylar spacers ranging from 19 to 254 microns ($\mu$m). The fluid suspension within the glass plates comprises nafoxidine hydrochloride, suspended in a glycerol solution. Such fluid suspensions have been tested with concentrations of the organic salt from 1 to 10% by weight. Generally, such suspensions have been produced by slowly cooling heated glycerol solutions of the organic salt. While different polymorphic forms of nafoxidine hydrochloride exist, the form utilized in these tests consisted of square platelets ranging in flat surface maximum dimensions of from 18 to 215 $\mu$m, with a thickness of 2.5-5 $\mu$m.

Because nafoxidine hydrochloride has a relatively low specific gravity (1.2), it is relatively easy to find an appropriate solvent (roughly matched in specific gravity) for both growing and suspending platelets. In contrast, other anisotropic platelet materials, such as the well known pearlescent materials guanine, titanium dioxide-coated mica and bismuth oxychloride, have relatively high densities, for which matched density dielectric suspension media have not yet been developed. It is possible however to suspend these materials in lower density media by using appropriate surfactants. Such suspensions are commercially used in the cosmetic industry for example. Commercial suspensions of this type have been tested and found to be operable in a device such as that shown in FIG. 1, though in their current form they are less stable than the suspensions prepared with nafoxidine hydrochloride.

As a general rule, the response and relaxation time of a device such as that shown in the FIG. 1 is directly proportional to the relative thickness of the platelets in the fluid suspension within the device. It is also important to note that the platelet materials of the suspension tend to be degraded in direct current electrical fields and low frequency alternating current fields (such as on the order of 60 Hertz or less). Accordingly, the preferred electrical field for use in the present invention is that with a frequency of at least 1 kilohertz (kHz).

In various tests of the invention, response time of the cell, in a 10 kHz AC field, has varied from 10-35 seconds at 3 volts to 1-7 seconds at 100 volts. There appears to be no threshold, a slow response on the order of minutes, was observed at one volt, for example.

The response time in magnetic fields was on the order of minutes for fields of 9.4-21.4 kilogauss (kG) with relaxation back from the transparent state to the reflective state, in a field of 2.4 kG or higher, in less than one minute. Spontaneous relaxation after electrical field orientation is slow, on the order of minutes to hours.

Generally speaking, it is preferred that the spacer dimension of a device as shown in FIG. 1, and therefore the overall thickness of the device, be minimized to enhance the effect of the imposed field and to enhance relative orientation parallel to the plates in the relaxed state of the device. However, the space between the parallel plates must be sufficiently great to permit rotation of the platelets and therefore should be on the order of from 1 to 100 times, preferably 1-10 times, the average of the maximum dimension of the individual platelets in the suspension.

In a series of tests utilizing nafoxidineglycerol suspension and a cell as described above, electrooptic effects observed have been studied at varying field strength and spacer thicknesses as summarized in Tables I and II below:

TABLE I

Electrooptic Switching of Nafoxidine Hydrochloride Pearlescent Platelets to "Needles"

| Spacer Thickness $\mu$m | Voltage V | Time Sec | Contrast Ratio[a] Plates/Needles |
|---|---|---|---|
| 19 | 1 | >120 | 1.3 |
| | 3 | 20 | 1.5 |
| | 10 | 3 | 1.5 |
| | 30 | 5 | 1.5 |
| | 100 | 7 | 1.5 |
| 51 | 1 | >120 | — |
| | 3 | 15 | 4.0 |
| | 10 | 10 | 4.0 |
| | 30 | 2 | 5.3 |

TABLE I-continued

Electrooptic Switching of Nafoxidine Hydrochloride Pearlescent Platelets to "Needles"

| Spacer Thickness μm | Voltage V | Time Sec | Contrast Ratio[a] Plates/Needles |
|---|---|---|---|
|  | 100 | 1 | 5.3 |
| 127 | 1 | >120 | — |
|  | 3 | 35 | 8.0 |
|  | 10 | 10 | 8.0 |
|  | 30 | 3 | 8.0 |
|  | 100 | 7 | 8.0 |
| 254 | 1 | >120 | — |
|  | 3 | >120 | — |
|  | 10 | 50 | 4.0 |
|  | 30 | 7 | 4.0 |
|  | 100 | 5 | 5.3 |

[a]The contrast ratio was determined by measuring percent transmission of platelet and "needle" states as measured between crossed polars, i.e. the platelet state

TABLE II

Magnetooptic Switching of Nafoxidine Hydrochloride Pearlescent Platelets to "Needles"

| Spacer Thickness μm | Field Strength KGauss | Time Minutes |
|---|---|---|
| 19 | 2.4 | >60 |
|  | 9.4 | 5 |
|  | 16.0 | 2 |
|  | 20.3 | 1 |
|  | 21.4 | .5 |
| 51 | 2.4 | >60 |
|  | 9.4 | 5 |
|  | 16.0 | 2 |
|  | 20.3 | 1 |
|  | 21.4 | 1 |
| 127 | 2.4 | >60 |
|  | 9.4 | 5 |
|  | 16.0 | 3 |
|  | 20.3 | 2 |
|  | 21.4 | 2 |
| 254 | 2.4 | >60 |
|  | 9.4 | 6 |
|  | 16.0 | 5 |
|  | 20.3 | 4 |
|  | 21.4 | 3 |

While this invention has been described with reference to specific embodiments thereof, it is not limited thereto and the appended claims are intended to be construed to encompass not only those forms of the invention described and referred to but to such other forms and embodiments as may be devised by those skilled in the art without departing from the true spirit and scope of this invention.

We claim:

1. An electro- or magneto-optic device comprising (a) a fluid suspension of anisotropic platelets in a dielectric medium, said platelets being mobile within said medium, and (b) means for subjecting said suspension to the influence of an electrical or magnetic field, said anisotropic platelets comprising a material having a density equal to or greater than that of nafoxidine hydrochloride and less than or equal to that of guanine.

2. A device, as recited in claim 1, wherein said suspension is retained between spaced parallel plates.

3. A device, as recited in claim 2, wherein said plates are transparent.

4. A device, as recited in claim 3, wherein said field subjecting means comprises electrodes associated with said plates, said electrodes being connected to an electrical potential, wherein at least a portion of said suspension is disposed between said electrodes.

5. A device, as recited in claim 4, wherein said electrodes comprise a transparent or semitransparent material.

6. A device, as recited in claim 2, wherein said spaced parallel plates are spaced from one another a distance of 1-100 times the average of the maximum dimension of said platelets.

7. A device, as recited in claim 2, wherein said spaced parallel plates are spaced from one another a distance of 1-10 times the average of the maximum dimension of said platelets.

8. A device, as recited in claim 1, wherein said field subjecting means comprises magnetic poles, at least a portion of said suspension being disposed between said magnetic poler.

9. A device, as recited in claim 1, wherein said platelets are 2.5-5 μm thick and 18-25 μm wide.

10. A device, as recited in claim 9, wherein said plates are spaced from 19 to 254 μm from one another.

11. A device, as recited in claim 10, wherein said field subjecting means electrodes are connected to an alternating current source with a frequency of at least 1 kHz.

12. A device, as recited in claim 1, wherein said platelets comprise nafoxidine hydrochloride.

13. A device, as recited in claim 12, wherein said dielectric medium comprises glycerol.

* * * * *